United States Patent [19]
Mullins

[11] 3,901,268

[45] *Aug. 26, 1975

[54] COPPER TUBE SERVICE VALVE

[76] Inventor: John W. Mullins, P.O. Box 20524, Oklahoma City, Okla. 73120

[*] Notice: The portion of the term of this patent subsequent to May 15, 1990, has been disclaimed.

[22] Filed: Dec. 14, 1973

[21] Appl. No.: 424,986

[52] U.S. Cl. ................. 137/318; 137/318; 137/382
[51] Int. Cl. ...................... B23b 41/08; F16e 41/04
[58] Field of Search ................... 137/315, 317, 318; 285/197, 198, 199

[56] References Cited
UNITED STATES PATENTS

| | | |
|---|---|---|
| 1,802,093 | 4/1931 | Slagel .................................. 137/382 |
| 3,448,758 | 6/1969 | Mullins .............................. 137/318 |
| 3,732,886 | 5/1973 | Mullins .............................. 137/318 |
| 3,788,345 | 1/1974 | Tura .................................. 137/318 |

*Primary Examiner*—Martin P. Schwadron
*Assistant Examiner*—David R. Matthews
*Attorney, Agent, or Firm*—Robert K. Rhea

[57] ABSTRACT

A generally cylindrical centrally bored housing is coaxially secured, at one end portion, within a short length of copper tubing. The other end of the copper tubing is bifurcated for connection with a line to be tapped. A valve equipped tubular core, having a length slightly less than the combined length of the housing and the copper tubing and having a line piercing tip, is provided with a tapered surface intermediate its ends for sealing with a cooperating housing seat when the core enters the bore of the housing. A cap, threadedly engaged with the free end of the housing, forces the line piercing tip into the line and seals the core within the housing.

1 Claim, 4 Drawing Figures

PATENTED AUG 26 1975  3,901,268

COPPER TUBE SERVICE VALVE

Cross Reference To Related Application

The present invention is an improvement over my copending application, Ser. No. 354,820, filed Apr. 26, 1973, now U.S. Pat. No. 3,815,624, for Copper Tube Service Valve.

BACKGROUND OF THE INVENTION

1. Field of the Invention.

The present invention relates to refrigerant lines and more particularly to a refrigerant line tapping service valve.

In order to maintain a refrigerating system operable it is necessary to periodically check and service the system and when necessary recharge the system with refrigerant gas. This is easily accomplished by the present invention which provides a valve equipped housing coaxially secured to a relatively short length of thin walled copper tubing wherein the opposite end of the copper tubing is bifurcated to partially surround and be connected, as by soldering, to a refrigerant gas containing copper line, thus, providing access to the bore of the refrigerant line intermediate its ends.

2. Description of the Prior Art.

The most pertinent prior art is my U.S. Pat. No. 3,732,886 which discloses a centrally bored housing coaxially secured to a short length of bifurcated copper tubing in turn straddling and secured to a line to be tapped. The housing bore axially receives slidably a gas passing valve equipped tubular core, having a line piercing tip at one end, which is sealed within the housing, during the line piercing action, by a cap threadedly engaging the housing end portion opposite the line being tapped and spinning the housing wall over the adjacent end edge of the tubular core.

The above described service valve operates satisfactorily when properly installed, however, the structure of the components employed does not give indication to a workman that the tubular core has been, in fact, sealed with the housing as the cap is progressively engaged with the housing. As a result a workman may forceably engage the cap with the housing and simultaneously force the line piercing tip end portion of the tubular core against the line being tapped and denting or partially flattening the line which generally results in a leak caused by an imperfect seal between the line and the line piercing tip. A further objection then arises wherein the cap, being excessively tightened, contacts the stem of the air valve core and maintains the air valve core in partially opened position with a resultant loss of refrigerant gas.

This invention overcomes these disadvantages by forming a tapered outer surface on the tubular core, intermediate its ends, converging toward the line piercing tip which cooperatively engages and seals with a seat formed on the wall forming the bore of the housing, thus interrupting axial movement of the tubular core through the housing beyond a predetermined limit.

SUMMARY OF THE INVENTION

A generally cylindrical centrally bored housing, having an annular internal shoulder and having external threads adjacent one end portion, is coaxially connected at its other end portion within one end portion of a relatively short length of copper tubing. The other end of the copper tubing is bifurcated by an arcuate recess formed on a radius complemental with the radius of a line to be tapped forming a pair of tube legs partially surrounding opposing side portions of a line to be tapped for connecting the copper tubing, as by soldering, to the line to be tapped which usually comprises copper tubing. The housing is preferably formed from brass stock for rigidity and connecting it to a line to be tapped requires a brazing action, thus requiring more heat than is necessary for soldering, as is well understood by persons skilled in the art. A centrally bored cylindrical core, having an annular external shoulder intermediate its ends and a line piercing tip at one end portion and having an overall length slightly greater than the spacing between the free end of the housing and inner surface of the wall of the line to be tapped when connected with the copper tubing, is coaxially received by the housing. The end of the core opposite its line piercing tip is internally threaded for receiving an air valve core opening and closing the bore of the core. The core is axially moved into the body by a cap threadedly engaged with the body which forces the line piercing tip through the wall of the line being tapped, in sealing relation therewith; seats and seals the core shoulder with the housing shoulder; and, simultaneously crimps the free end portion of the housing wall inwardly in overlapping locking and sealing relation against the adjacent end of the core.

The principal object of this invention is to provide a service valve containing housing and connector which may be easily attached to a line to be tapped including a self-tapping core which is forced into the line to be tapped by a housing cap forming a locking seal between the core and housing intermediate their ends and with the end of the core opposite its line piercing tip.

DESCRIPTION OF THE PREFERRED EMBODIMENTS

Figure 1:
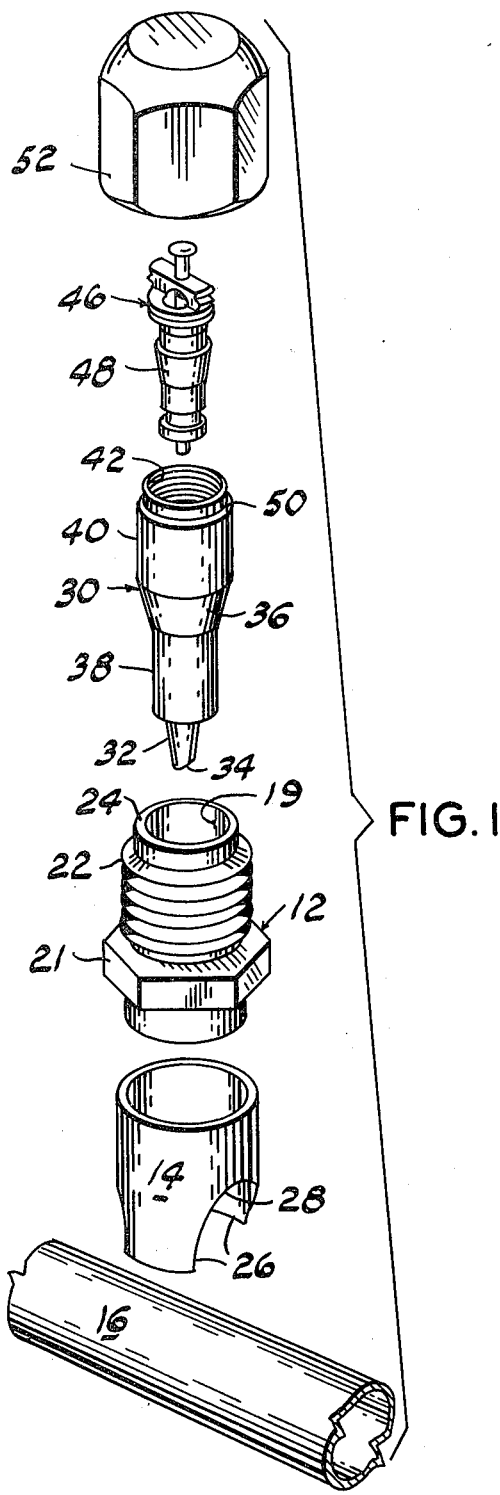
FIG. 1 is an exploded perspective view of the valve components.

Like characters of reference designate like parts in those figures of the drawings in which they occur.

In the drawings

Figure 2:
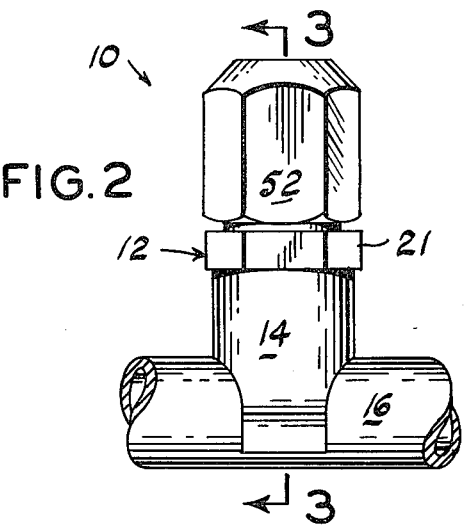
FIG. 2 is a side elevational view of the valve and connector joined to a fragmentary portion of a line.
Figure 3:
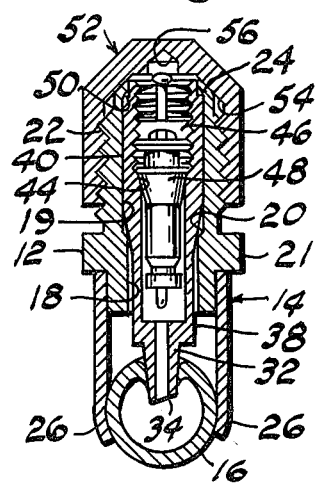
FIG. 3 is a vertical cross-sectional view taken substantially along the line 3—3 of FIG. 2; and, FIG. 4 is a view similar to FIG. 3 illustrating an alterative embodiment.

Referring to FIGS. 1, 2 and 3, the reference numeral 10 indicates the preferred embodiment of the device, as a whole, comprising a housing 12 secured to a line connector 14 in turn mounted on a line 16 to be tapped. The housing 12 is generally cylindrical, having a bore 18, a counterbore 19 forming an annular shoulder 20 intermediate its ends and having a hexagonal head 21 forming wrench flats intermediate its ends. One end portion of the housing is externally threaded, as at 22. This end portion of the housing is characterized by a reduced periphery forming a relatively thin wall 24 extending outwardly of the threads 22 for the purposes presently explained. The annular shoulder 20 is formed by the end surface of the larger size drill bit, not shown, forming the counterbore 19. The shoulder 20 generally faces toward the housing thin wall 24 for the purpose presently apparent.

The other end portion of the housing, opposite the threads 22, is coaxially received within one end portion of the tubular connector 14 and is secured thereto, as by brazing, to form a gas and fluid tight joint. The connector 14 is preferably formed of the same material and wall thickness as the line 16 to be tapped. As mentioned hereinabove, in practice, the line 16 usually comprises a length of copper tubing and in this event the connector 14 is similarly formed from a length of copper tubing usually diametrically slightly greater than the diameter of the line 16 for the reasons readily apparent.

The other end portion of the connector 14, opposite its housing connected end, is bifurcated by forming a transverse substantially U-shaped slot through its wall end portion defining opposing connector legs 26 and an arcuate bight portion or surface 28, preferably having a radius the same as the outside radius of the line 16, for attaching the connector 14 to the line 16. This is accomplished by placing the bifurcated end of the connector on the line with the legs 26 straddling the line and the connector wall arcuate surface 28 contacting a peripheral portion of the line. In the examples shown the free end portion of the legs 26 usually project beyond the horizontal diameter of the line, as viewed in FIG. 3, permitting the free end portion of the legs to be crimped or bent inwardly in contacting relation in a partial wrap-around action on the line 16 thus temporarily positioning the connector on the line. Alternatively the length of the legs defined by the distance between the arcuate surface 28 and the free end surface of the legs 26 may be slightly less than the diameter of the line 16 to be tapped. The connector 14 is then secured to the line, as by soldering, which is easily accomplished for the reason that the connector 14 and line 16 being formed of the same material and substantially same wall thickness is easily heated to a soldering temperature.

A substantially cylindrical core 30, preferably formed of hardened metallic material, is coaxially received by the housing bores 18 and 19. The core is provided, at one end portion, with a coaxial diametrically reduced centrally bored line piercing tip end portion 32 converging toward its free end and characterized by a beveled end surface 34 forming a line cutting or piercing tip. The overall length of the core and its tip 32 is slightly greater than the spacing between the free end of the housing wall 24 and the adjacent surface of the line 16 so that the core may be substantially completely enclosed by the housing with its cutting tip entering the line 16 in the manner presently explained.

Intermediate its ends the core 30 is provided with an external inverted truncated conical surface forming an annular tapered shoulder 36 facing toward the tip 32 and defining a core reduced end portion 38 freely received by the housing bore 18 and defining an opposite larger end portion 40 slidably received axially by the housing counterbore 19.

The core 30 is further characterized by internal threads 42, at its end portion opposite its tip 32, with the threads terminating inwardly of the core adjacent a beveled shoulder 44 for threadedly receiving a conventional air valve core 46 having a seal 48 sealing with the core shoulder 44. The end portion of the core, at its internally threaded end, has a portion of its periphery circumferentially reduced to form an annular shoulder 50.

An internally threaded cap 52 threadedly engages the housing threads 22 and forces the core 30 toward and into the line 16. The cap 52 is characterized by a converging wall surface 54 defining its inner closed end, inwardly of its threads, wherein this surface 54 forces the housing thin wall end 24 toward and against the circumferentially reduced end portion of the core 30 outwardly of its end shoulder 50 in a spinning or crimping sealing action of the wall 24 for holding the core in place. The cap 52 is preferably provided with a coaxial socket 56 for loosely surrounding the free end portion of the air valve core stem.

Figure 4:
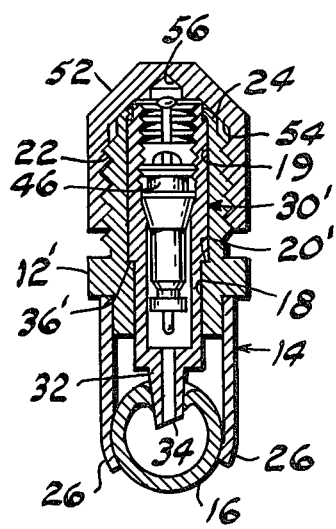

In the alternative embodiment illustrated by FIG. 4, the housing 12' is provided with an annular shoulder 20' normal to the longitudinal axis of the housing and facing toward the housing thin wall 24. The core 30' is provided with a cooperating intermediate annular shoulder 36' normal to its longitudinal axis, seating and sealing with the housing shoulder 20'.

Operation

In operation the housing 12 is connected with the connector 14, as described hereinabove, at the time of manufacture. The air valve equipped core 30 and cap 52 is supplied to the refrigerant service personnel with the assembled housing 12 and connector 14. The serviceman places the connector 14 in straddling relation upon the line 16 to be tapped and makes a soldered connection as described hereinabove.

It should be noted that this soldered connection between the connector 14 and line 16 need not necessarily be fluid tight for the reason presently explained, however, this soldered joint between the connector 14 and line 16 must be sufficiently strong to permit withstanding the line piercing action as described hereinbelow.

The core 30, having the air valve 46 installed therein, is axially inserted into the housing counterbore 19 so that the core tip 32 contacts the surface of the line 16. In this position the intermediate core shoulder 36 is disposed in spaced relation with respect to the housing shoulder 20 a distance substantially equal to the desired penetrating depth of the tip 32 into the line 16. The cap 52 is then manually engaged threadedly with the housing threads 22. A pair of suitable wrenches, not shown, are placed, respectively, on the housing head 21 and periphery of the cap 52 for continuing the threaded engagement of the cap 52 with the housing wherein, as the cap 52 is progressively moved toward the housing head 21, the beveled inner surface 54 of the cap contacting the wall edge at the threaded end portion of the core progressively forces its tip 32 through the wall of the line 16 in a piercing and sealing action while simultaneously engaging the shoulders 36 and 20 in a wedging and seating contact thus stopping axial movement of the core through the housing. When the wall of the threaded end of the core is coextensive with the housing wall 24, the beveled inner surface 54 of the cap contacts the free end portion of the housing wall 24 and forces it inwardly in a crimping and sealing relation with respect to the reduced end portion of the core wall outwardly of its annular end shoulder 50. Since the material forming the core 30 is preferably formed of relatively hard material, such as steel, its tip 32 forms a gas and liquid tight seal where it pierces the wall of the line 16, between the shoulders 36 and 20 and further the thin wall 24 of the housing forms a secondary seal around the periphery of the core, at its threaded end, thus, eliminating the necessity of the fluid tight seal between the connector 14 and line 16. The bore of the core 30 is now in communication with the bore of the line 16 and by removing the cap 52 refrigerant gas may be added to or removed from the line 16 by the air core 46 opening the bore of the core 30.

Operation of the alternative embodiment of FIG. 4 is substantially identical.

Obviously the invention is susceptible to changes or alterations without defeating its practicability, therefore, I do not wish to be confined to the preferred embodiment shown in the drawings and described herein.

I claim:

1. A self-tapping service valve for a tubular line, comprising:

a generally cylindrical centrally bored housing having wrench flats intermediate its ends and having a diametrically reduced periphery forming a relatively thin wall at one end portion, said housing having an internal annular shoulder intermediate its ends facing toward said thin wall end portion, said housing having external threads extending between said wrench flats and said thin wall portion;

a tubular member coaxially secured, at one end portion, to the end portion of said housing opposite said threads, the other end portion of said tubular member being transversely bifurcated for forming a U-shaped slot having a bight portion formed on a radius substantially the same as the outside radius of a line to be tapped and defining a pair of legs straddling a line to be tapped, said tubular member having a wall thickness substantially equal with respect to the wall thickness of a line to be tapped;

a tubular core, having a length slightly greater than the spacing between the free end surface of said housing thin wall portion and the bight portion of the U-shaped slot, coaxially freely received by the bore of the housing, said core having a diametrically reduced tapered end portion converging toward a line to be tapped when disposed within the U-shaped slot, said tapered end portion terminating in a beveled end surface forming a line piercing tip, said core having an external annular shoulder intermediate its ends facing toward the line piercing tip, said core having a diametrically reduced peripheral portion adjacent its end opposite said line piercing tip forming an annular end shoulder adjacent the housing thin wall portion, said core having internal threads at its end portion opposite said line piercing tip and having a seat formed on its inner wall surface at the inner limit of the threads;

an air valve sealing with the seat in said core; and, a cap engaging the threads on said housing, said cap having a beveled inner end surface contacting the adjacent outwardly disposed end surface of said core and forcing the line piercing tip of said core into a line to be tapped while simultaneously seating and sealing said core intermediate shoulder with said housing internal shoulder and subsequently contacting the outer end surface of said housing thin wall portion and forcing the latter inwardly against the outer surface of said core outwardly of said annular end shoulder in locking relation as said cap is progressively engaged threadedly with said housing.

* * * * *